United States Patent
Hameed et al.

(10) Patent No.: US 11,126,340 B2
(45) Date of Patent: Sep. 21, 2021

(54) SYSTEMS AND METHODS FOR DYNAMICALLY GENERATING CUSTOMIZED WEB-BASED PAYMENT INTERFACES

(71) Applicant: MASTERCARD INTERNATIONAL INCORPORATED, Purchase, NY (US)

(72) Inventors: Siddique Hameed, Chesterfield, MO (US); Ellen Christine Walz, St. Louis, MO (US); Stephen Bongner, Dardenne Prairie, MO (US); Sarala Buradagunta, West Orange, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/280,743

(22) Filed: Feb. 20, 2019

(65) Prior Publication Data
US 2020/0264766 A1  Aug. 20, 2020
US 2021/0247893 A9  Aug. 12, 2021

(51) Int. Cl.
*G06F 3/048* (2013.01)
*G06F 3/0484* (2013.01)
(Continued)

(52) U.S. Cl.
CPC ........ *G06F 3/04847* (2013.01); *G06F 3/0482* (2013.01); *H04L 67/02* (2013.01)

(58) Field of Classification Search
CPC ........... G06Q 30/0601; G06Q 30/0248; G06Q 30/06; G06Q 40/025; G06Q 20/02;
(Continued)

(56) References Cited

U.S. PATENT DOCUMENTS 7,167,844 B1   1/2007  Leong et al.
9,972,047 B1*  5/2018  Elliott .................... G06Q 40/00
(Continued)

FOREIGN PATENT DOCUMENTS

WO   2014201537 A1   12/2014

OTHER PUBLICATIONS

Abdellaoui et al.; Integration of New Electronic Payment Systems into B2C Internet Commerce; 2011; IEEE; 8 pages.*

*Primary Examiner* — Linh K Pham
(74) *Attorney, Agent, or Firm* — Armstrong Teasdale LLP

(57) ABSTRACT

Methods and a computer system for dynamically generating an embedded payment interface are described herein. The method includes obtaining rules that define a desired configuration of the embedded payment interface. The method also includes storing rules, storing a default interface template having a default configuration, and receiving an access message indicating that the webpage is accessed at a remote computing device, the access message including a plurality of data elements associated with the webpage and the access of the webpage by the remote computing device. The method also includes accessing the default interface template, generating customization commands that define an output configuration of the embedded payment interface by applying the rules to data elements, applying the customization commands to the default interface template to produce a payment interface having the output configuration corresponding to the desired configuration, and embedding the payment interface in the accessed webpage.

20 Claims, 7 Drawing Sheets

(51) Int. Cl.
*H04L 29/08* (2006.01)
*G06F 3/0482* (2013.01)
(58) Field of Classification Search
CPC ........ G06Q 20/12; G06Q 20/04; G06Q 20/14; G06Q 20/24; G06Q 20/123; G06Q 20/1235
See application file for complete search history.

(56) References Cited

U.S. PATENT DOCUMENTS

| | | | |
|---|---|---|---|
| 2012/0158589 A1* | 6/2012 | Katzin | G06Q 20/384 |
| | | | 705/44 |
| 2016/0350838 A1* | 12/2016 | Tsao | G06Q 30/0641 |
| 2017/0004573 A1* | 1/2017 | Hussain | G06F 16/93 |
| 2017/0278085 A1* | 9/2017 | Anderson | G06Q 20/227 |
| 2018/0096301 A1* | 4/2018 | Kirk | G06Q 10/10 |
| 2018/0107992 A1* | 4/2018 | Al-Bedaiwi | G06Q 20/367 |
| 2018/0181716 A1 | 6/2018 | Mander et al. | |
| 2018/0276640 A1* | 9/2018 | Kohli | G07G 5/00 |

\* cited by examiner

SYSTEMS AND METHODS FOR DYNAMICALLY GENERATING CUSTOMIZED WEB-BASED PAYMENT INTERFACES

BACKGROUND

This disclosure relates generally to dynamically generating customized web-based content and, more specifically, to systems and methods for generating a customized web-based payment interface based on one or more rules.

Many merchants are enabling consumers to purchase goods or services from the merchant online, such as, for example, at a website hosted by the merchant. The merchant may format the various webpages of the website with very particular functional and aesthetic characteristics, including incorporating the merchant's branding onto the webpages. The consumer navigates these particularly formatted pages to select items for purchase, which are added to a virtual cart.

The consumer then navigates to a checkout or payment webpage. Frequently, the merchant employs a third-party "plug-in" or "widget" that provides a payment interface where the consumer can enter their payment credentials to complete the purchase. These third-party plug-ins may be provided by payment processing entities, for example, and incorporate necessary security and processing features that the merchant may be unable to provide. However, this plug-in or widget is typically branded according to the third party, which can disrupt the user experience, when the third-party branding is not cohesive with the merchant's website aesthetic, or when the plug-in does not render well in the merchant's webpage (e.g., is too wide or off-center with respective to the rest of the webpage). In some cases, these third-party plug-ins may render certain elements of the plug-in within the webpage in such a way that these elements are difficult for the consumer to access or may even be inaccessible.

In some cases, the third party and the merchant have worked together to incorporate the merchant's branding into the plug-in, or have otherwise formatted the plug-in to blend into the payment webpage. However, such formatting is hard-coded into the plug-in for access only at that payment webpage, and changing the formatting typically requires manual recoding that can be time- and effort-intensive, and, accordingly, can be costly to the merchant.

Accordingly, these known systems and methods that enable payment plug-ins on webpages are generally static and do not allow for customization and/or dynamic generation thereof. Thus, there is a need for a technical solution to improve the dynamic and customized nature of generating web-based payment interfaces both to serve merchant needs and improve the customer user experience.

BRIEF DESCRIPTION

In one aspect, a computer-based method for dynamically generating an embedded payment interface to enable integration of the embedded payment interface with a webpage into which the embedded payment interface is embedded upon loading of the webpage is provided. The method is implemented using a computer system that includes a processor and a memory. The method includes obtaining, from a host of the webpage, a first set of rules that define a desired configuration of the embedded payment interface as a function of at least one of a configuration of the webpage and one or more integration characteristics associated with the webpage and the embedded payment interface. The method also includes storing, in the memory, the first set of rules, storing, in the memory, a default interface template having a default configuration, and receiving an access message indicating that the webpage is accessed at a remote computing device. The access message includes a plurality of data elements associated with the webpage and the access of the webpage by the remote computing device. The method also includes accessing the default interface template, and generating a set of customization commands that define an output configuration of the embedded payment interface by applying the first set of rules to the plurality of data elements. The method further includes applying the customization commands to the default interface template to produce a payment interface having the output configuration corresponding to the desired configuration, and embedding the payment interface in the accessed webpage to produce the embedded payment interface.

In another aspect, a custom rules (CR) computer system for dynamically generating an embedded payment interface to enable integration of the embedded payment interface with a webpage into which the embedded payment interface is embedded upon loading of the webpage is provided. The CR computer system includes a processor and a memory, and is configured to obtain, from a host of the webpage, a first set of rules that define a desired configuration of the embedded payment interface as a function of at least one of a configuration of the webpage and one or more integration characteristics associated with the webpage and the embedded payment interface. The CR computer system is also configured to store, in the memory, the first set of rules and a default interface template having a default configuration. The CR computer system is configured to receive an access message indicating that the webpage is accessed at a remote computing device, the access message including a plurality of data elements associated with the webpage and the access of the webpage by the remote computing device, access the default interface template, and generate a set of customization commands that define an output configuration of the embedded payment interface by applying the first set of rules to the plurality of data elements. The CR computer system is further configured to apply the customization commands to the default interface template to produce a payment interface having the output configuration corresponding to the desired configuration, and embed the payment interface in the accessed webpage to produce the embedded payment interface.

In yet another aspect, a non-transitory computer-readable storage medium is provided that includes computer-executable instructions for dynamically generating an embedded payment interface to enable integration of the embedded payment interface with a webpage into which the embedded payment interface is embedded upon loading of the webpage. When executed by a computer system including a processor in communication with a memory device, the computer-executable instructions cause the computer system to obtain, from a host of the webpage, a first set of rules that define a desired configuration of the embedded payment interface as a function of at least one of a configuration of the webpage and one or more integration characteristics associated with the webpage and the embedded payment interface, and store the first set of rules and a default interface template having a default configuration. The computer-executable instructions also cause the computer system to receive an access message indicating that the webpage is accessed at a remote computing device, the access message including a plurality of data elements associated with the webpage and the access of the webpage by the remote computing device, access the default interface template, and generate a set of customization commands that define an output configuration of the embedded payment interface by applying the first set of rules to the plurality of data elements. The computer-executable instructions further cause the computer system to apply the customization commands to the default interface template to produce a payment interface having the output configuration corresponding to the desired configuration, and embed the payment interface in the accessed webpage to produce the embedded payment interface.

BRIEF DESCRIPTION OF THE DRAWINGS

FIG. 1 is a simplified block diagram of a dynamic interface generation (DIG) system that includes a custom rules (CR) computing device for receiving generation rules from a partner client and dynamically generating an embedded payment interface based upon the received rules.

FIG. 2 illustrates an example configuration of a user system such as a client system shown in FIG. 1.

FIG. 3 illustrates an example configuration of the CR computing device shown in FIG. 1.

FIG. 4 is a schematic block diagram illustrating the flow of data between components of the DIG system shown in FIG. 1.

FIG. 5 depicts a first flow diagram illustrating the initialization of customization rules using the DIG system shown in FIG. 1.

FIG. 6 depicts a second flow diagram illustrating the dynamic generation of an embedded payment interface by the CR computing device shown in FIG. 1.

FIG. 7 is a flow chart of a method of dynamically generating an embedded payment interface to enable integration of the embedded payment interface with a webpage into which the embedded payment interface is embedded upon loading of the webpage.

DETAILED DESCRIPTION

Figure 1:
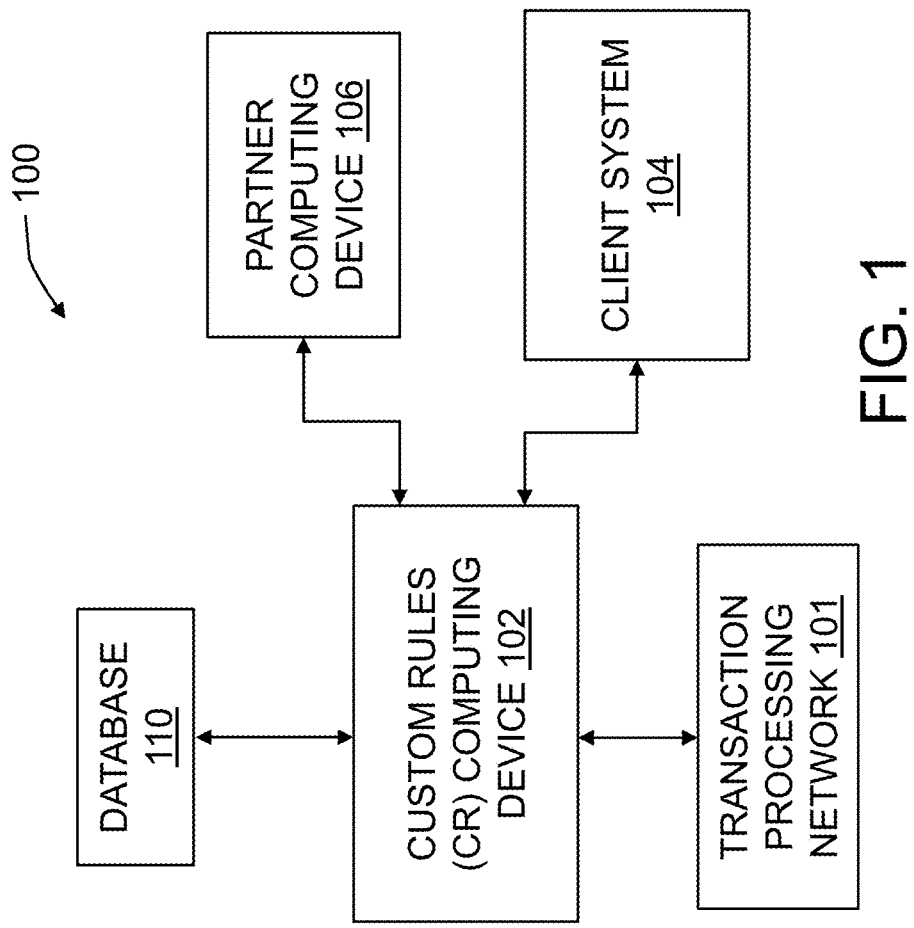
FIGS. 1-7 show example embodiments of the methods and systems described herein.

The systems and methods described herein are for dynamically generating payment interfaces using a dynamic interface generation (DIG) computer system that includes a custom rules (CR) computing device. As described herein, a payment interface may include a form, set of fields, or other set of components that facilitate a user of a website entering payment credentials to initiate a purchase transaction. An "embedded" payment interface is a payment interface that is integrated into an existing webpage. In other words, the payment interface is provided in the webpage to provide the functionality thereof without requiring navigation to a separate webpage. "Dynamic" generation of an embedded payment interface refers to substantially real-time generation (e.g., on the fly) of the payment interface as an embedded payment interface when the webpage into which the payment interface is embedded loads on a remote user computing device. In other words, the payment interface is not formatted or otherwise available prior to the webpage being loaded at the remote user computing device. Rather, one or more rules that define how the payment interface should be visually and/or functionally formatted are applied in substantially real-time, to generate the embedded payment interface on the webpage each time the webpage is loaded. "Loading" a webpage refers generally to accessing the webpage for viewing at a remote user computing device and may be initialized upon a user navigating to the webpage by selecting a hyperlink, entering a URL into a web browser, or otherwise directing a web browser to navigate to the webpage for access by the user.

It should be understood that although the embedded payment interface is described herein as being embedded on a webpage, the embedded payment interface may effectively constitute the whole webpage provided to the user.

A customer (also referred to herein as a payor, user, or cardholder) navigates to a webpage to complete a purchase of goods or services from a merchant (a "payment transaction" or "purchase transaction"). This webpage is referred to as a "hosted payments" webpage, as the webpage incorporates payment features "hosted" or provided by a merchant or payment processor to facilitate payment from that webpage. In other words, by providing a hosted payments webpage, the customer need not navigate away from the merchant's website to complete the purchase transaction. Typically, to complete the purchase transaction, the user provides their payment credentials (e.g., a credit or debit card number, user log-in information corresponding to saved payment credentials, a bank account number, digital wallet information, etc.) into a payment interface on the hosted payments webpage. The hosted payments webpage, and particularly the payment interface, incorporate various access control features, such as security features, to ensure proper functionality of the webpage and to reduce the potential of fraud (e.g., the payment credentials being fraudulently accessed after entry by the user, or fraudulent payment credentials being provided by the user). The embedded payment interface provides a form or other user interface to facilitate entry to payment details from a user, and further provides access to secure payment services (e.g., conversion of the payment details to a secure ISO 8583 or ISO 20022 format for processing).

In the example embodiment, a gateway payment provider provides one or more payment services to one or more partners of the gateway payment provider. The gateway payment provider may include, for example, a transaction processing network or another third-party entity. A partner thereof may include, for example, a merchant or an acquirer (i.e., a bank providing banking services to one or more merchants). The gateway payment provider provides, in the example embodiment, the embedded payment interface to the partner to facilitate the partner accepting payment for goods or services online from a customer. For example, the embedded payment interface includes functionality to convert web-based user input (e.g., into one or more payment forms on a checkout webpage hosted by a merchant partner) into an encrypted and/or otherwise secured authorization request message (e.g., an ISO 8583 message) for transmission via the gateway payment provider and subsequent processing. In the example embodiment, a hosted webpage may be hosted by a partner (e.g., a merchant or acquirer), whereas the embedded payment interface embedded in the hosted webpage may be hosted by the gateway payment provider.

As described further herein, the gateway payment provider also facilitates virtually unlimited customization of the embedded payment interface, as well as virtually unlimited flexibility in changing or updating such customization. The gateway payment provider provides a customization portal including a rule palette that enables a partner to define their own rules for the embedded payment interface, including visual or aesthetic rules as well as access control features. The partner interacts with the customization portal to input one or more customization rules, and parameters defining each rule. The CR computing device described herein receives and stores the customization rules and, upon the hosted webpage being loaded, actively applies the rules to a default interface template to generate a customized, embedded payment interface in real-time. The CR computing device therefore circumvents problems described above with respect to hard-coded payment interfaces.

The default interface template, which may also be referred to as a universal template or shell, includes default generation rules such that, if no customization rules are input by a user, a same (default) payment interface would be generated. The default payment interface includes no aesthetic or functional customization but does include any and all input fields necessary for a user or customer to complete a payment transaction. In this way, if a partner does not have preferences for certain features or wants to implement a payment interface prior to finalizing various branding decisions, the partner may still access the functionality of the payment interface from the gateway payment provider to accept online payments. The default interface template is therefore considered to be associated with a plurality of default rules defining a default configuration of the payment interface.

The customization portal, in the example embodiment, enables the partner to dynamically input and/or select a plurality of customization rules to customize features of the embedded payment interface, including look-and-feel or aesthetic aspects as well as functionality and access control features. The aesthetic aspects and functionality of a payment interface are referred to collectively herein as a "configuration" of the payment interface. The customization portal may enable a partner to customize, for example, but not limited to, a size of the embedded payment interface, an orientation of the embedded payment interface, a location of the embedded payment interface on the displayed hosted webpage, a display language, a currency, a header, a footer, text, colors, other branding features, an overall theme, additional graphics, promotional features, security features, authentication features, and/or other features. The partner customizes these aspects of the payment interface by creating rules that define the configuration of the payment interface. Each rule is associated with one or more parameters. Parameters may tie some features to other features (e.g., a language may be tied to a currency). Parameters may tie certain features to various characteristics of the access of the hosted webpage by the user computing device, including, but not limited to, a location of the remote computing device, a device type of the remote computing device, a time of access of the webpage, a date of access of the webpage, a browser identifier of a web browser used to access the webpage at the remote computing device, an operating system of the remote computing device, display characteristics of the webpage at the remote computing device, and log-in credentials provided at the remote computing device.

For example, a parameter for a size rule may tie the display size of the embedded payment interface to a device type of the user computing device used to access the hosted webpage (e.g., a smaller interface at a cell phone, and a larger interface at a laptop computer). A parameter for a language rule may tie the display language to a location of the user computing device or a user profile (where a user may define a preferred display language). A parameter for a promotional content rule may tie the display of promotional content or the provision of promotional features (e.g., discounts or coupons) to a time or date of access, a location, and/or log-in credentials. The partner may define a rule that prevents access to the embedded payment interface for certain types of devices, for unsecured connections, for devices in certain locations, or in response to other features of the user computing device or the transaction. Accordingly, certain parameters define an "input condition" to a rule and an "output condition" of a rule that is dependent upon the input.

Additional and/or alternatives rules may include, for example but without limitation, time- and/or date-based rules. Such time-based rules are associated with times and/or dates for which certain webpage content, such as the embedded payment interface or features thereof, is active and/or accessible by a user. For example, certain promotional features may only be available for a particular time period (e.g., one or more days, weeks, months, or years). As another example, a particular embedded payment interface may be associated with an event having a limited time period, such as an embedded payment interface for a time-limited donation, fundraiser, flash sale, or other such event. Accordingly, the embedded payment interface may only be accessible during the limited time period. If a user attempts to access the webpage including the embedded payment interface during a different time (e.g., after the expiration of the limited time period), the embedded payment interface may not be generated, and/or an error message may be displayed.

The rules engine may additionally or alternatively enable the creation, storage, and use of fraud prevention rules. Fraud prevention rules may utilize various access characteristics (and/or other data) as input parameters thereto. Example fraud prevention rules may include CVC/CVV validation rules. The rules engine may allow an administrator to enable and disable an entry field for a CVC/CVV code based on, for example, a transaction amount, a shipping or billing address (e.g., shipping to or billing to Alaska addresses), time of day, etc. The rules engine may allow the administrator to enable or disable any other fraud prevention rule based on similar (or alternative) parameters, including a ZIP code validation rule. Other fraud prevention rules may include an address match rule (e.g., a shipping address must match a billing address), an additional authentication rule (e.g., activating an additional authentication protocol, such as 3-D SECURE), and location-based rules (e.g., only allowing access to the embedded payment interface for users in white-listed locations, and/or disallowing access to the embedded payment interface for users in black-listed locations). It should be readily understood that such rules may use one or more input parameters, and may be enabled/disabled based on certain input parameters such that one or more rules are only activated or enabled under certain circumstances.

The customization portal may include a drag-and-drop interface and/or include any other input and control features, including drop-down menus, sliders, buttons, text input fields, image or other content upload options that facilitate flexibility in rule input. The customization portal may further provide a visual data flow of the input rules, including a visualization of parameters (including input and output conditions) of one or more rules to facilitate visualization of "if-then" rules (e.g., if the user computing device in Canada, then the payment interface should display a logo that includes a maple leaf). The customization portal may also include functionality that enables the partner to prioritize rules. For instance, one rule may prevent access in China unless a tokenized user computing device is used to access the webpage. Accordingly, the partner may prioritize a rule defining particular aspects of the payment interface based on the accessing user computing device over a rule defining aspects of the interface based on location. Additionally or alternatively, the CR computing device (e.g., a rule engine thereof, described herein) may automatically apply priorities based on logic.

In the example embodiment, the partner accesses the customization portal in an initialization or onboarding process with the gateway payment provider. The partner may further have access to the customization portal at any time to update or change the rules.

The CR computing device includes a rules engine configured to process each customization rule input by the partner and the parameters of each rule. Specifically, the rules engine is configured to convert each input rule into a customization command to be applied to the default template when the hosted webpage is accessed or loaded on a user computing device. If the partner does not input a rule for particular display features and/or functionality of the embedded payment interface, the rules engine will not generate a customization command for that particular aspect of the embedded payment interface, such that a default rule is implemented to that particular aspect.

When the hosted webpage (e.g., the webpage hosted by the partner into which a payment interface is to be embedded) is loaded on a user computing device, an access message is transmitted to the CR computing device from the user computing device. The access message is also referred to as a "payload" and provides a plurality of data elements to the CR computing device. These data elements maybe referred to as "access characteristics" and are associated with the hosted webpage and/or access of the hosted webpage by the user computing device. Access characteristics may include, for example, but not limited to, device information associated with the user computing device (including location, device type, browser information, etc.), a time stamp of the access, the particular merchant hosting the accessed webpage, and user input previously provided to the hosted webpage (e.g., user log-in credentials, a user profile, cart data). The access message, in the example embodiment, also includes a secure signature (e.g., a private key) such that the CR computing device can validate the access message or otherwise confirm that the access message, and the data therein, is properly associated with the hosted webpage. The secure signature and/or one or more alternative data element(s) of the access message may include an identification of the partner hosting the webpage, an acquirer thereof, and/or other data elements that may affect the processing of transactions initiated on the hosted webpage via the embedded payment interface.

The CR computing device validates the access message and parses the access message to identify one or more of the access characteristics. The CR computing device uses the access characteristics to initiate generation of the embedded payment interface. Specifically, the rules engine of the CR computing device uses the access characteristics as inputs to the one or more customization rules and generates customization commands based on the output conditions of the customization rules, wherein the customization commands define the output configuration of the embedded payment interface.

The embedded payment interface is then displayed on the hosted webpage at the user computing device. The customer uses the embedded payment interface to complete the checkout process and initiate a payment transaction. For example, the user may enter payment credentials, a shipping address, a billing address, authentication information, and/or any other information into the embedded payment interface. The information input to the embedded payment interface is transmitted to the CR computing device without intervention by the partner hosting the webpage. In other words, the partner does not, in the example embodiment, receive information input to the embedded payment interface when the transaction is initiated, which may facilitate maintaining the security of the information input to the embedded payment interface (e.g., payment credentials).

As described herein, the CR computing device includes a payment processing module that facilitates transmission of transaction data to a transaction processing network (which may be the gateway payment provider) for subsequent authorization (and/or authentication) processing. The transaction processing network returns the result of the transaction processing to the CR computing device in an authorization result message. If the transaction was authorized successfully, the transaction processing network transmits the authorization result message including a success indicator data element to the CR computing device, and the CR computing device causes the hosted webpage to load a "payment successful" message or navigate to another webpage (e.g., at which the customer is provided details of the authorized payment, such as a receipt and an order number). If the authorization was unsuccessful, the transaction processing network returns the authorization result message including a failure indicator data element to the CR computing device, and the CR computing device causes the hosted webpage to request alternative payment details or additional information, or otherwise indicates to the customer that the payment was not successfully processed.

Some of the aspects of the transaction processing may be defined by the partner's customization rules. For instance, the partner may define a customization rule that requires additional authentication (e.g., for every customer, for customers from a certain location, for transaction initiated at a certain time or for a transaction amount above a threshold). The partner may further define how the authentication is to proceed to direct the customer to input additional authentication details. The partner may define a customization rule that defines how a "payment successful" webpage is to be displayed, or where to direct a customer if a payment is unsuccessful (e.g., to a customer service page). In some embodiments, the partner hosting the webpage may define one or more rules for how a transaction is to be processed, even though the partner is not directly involved in the transaction processing. For example, the partner may input customization rules defining which transaction processors should be used, what types or brands of payment cards to accept, and other such rules. Certain rules may also be automatically implemented based on a particular partner's relationships with acquirers or transaction processing networks.

Moreover, an acquirer partner may define rules that affect payment interfaces for a plurality of merchants with which the acquirer has relationships. For example, the acquirer may require all merchants to accept only MASTERCARD or VISA payment cards, and to not accept AMERICAN EXPRESS payment cards. An acquirer may define a rule that prevents access to the embedded payment interface for any non-US merchant. In some embodiments, the rules engine may override merchant-input rules in cases where the acquirer has a rule set that contradicts a rule the merchant partner is trying to input, or may display an error message or other alert to a merchant partner as the merchant partner is setting up their own rules.

A technical effect of the systems and processes described herein include at least one of: (i) real-time generation of a fully customizable payment interface embedded on a hosted webpage; (ii) real-time application of customization rules to generate the interface based on the particular access of the hosted webpage; (iii) improved security of online payment transaction by eliminating the need for partner intervention, reducing access to sensitive information; (iv) improved customer experience on a hosted webpage; (v) improved speed of the system over existing plug-in payment systems; and (vi) less storage capability required, as only the rules are stored rather than storing fully hard-coded page instructions.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, a card that is part of a digital wallet, and/or any other device that may hold payment account information, such as mobile phones, Smartphones, personal digital assistants (PDAs), key fobs, and/or computers. Each type of transactions card can be used as a method of payment for performing a transaction. As used herein, the term "payment account" is used generally to refer to the underlying account with the transaction card.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

dynamic interface generation (DIG) system that includes a custom rules (CR) computing device for receiving generation rules from a client and dynamically generating an embedded payment interface based upon the received rules.

FIG. 1 is a simplified block diagram of an example embodiment of a dynamic interface generation (DIG) system 100 for receiving generation rules from a client and dynamically generating an embedded payment interface based upon the received rules. DIG system 100 is associated with a gateway payment provider (not specifically shown), such as a transaction processing network 101. In the example embodiment, system 100 includes a custom rules (CR) computing device 102. System 100 further includes one or more client systems 104 in communication with CR computing device 102. In the example embodiment, client systems 104 are mobile devices, such as any mobile device capable of interconnecting to the Internet including a web-based phone, also referred to as smart phone, personal digital assistant (PDA), tablets, or other web-based connectable equipment. Client systems 104 may also include a laptop device, a desktop device or any other computing device capable of connecting to the Internet. Although only one client system 104 is shown for illustration purposes, it should be understood that system 100 could include many more client systems 104. Client systems 104, which are also referred to herein as "user computing devices" and "remote computing devices," may each be associated with a user such as a customer, or a cardholder. Client systems 104 may be interconnected to the Internet through a variety of interfaces including a network, such as a local area network (LAN) or a wide area network (WAN), dial-in connections, cable modems and special high-speed ISDN lines.

System 100 also includes a plurality of partner computing devices 106, which are in communication with CR computing device 102. Partner computing devices 106 may also be in communication with client systems 104. Partner computing devices 106 are each associated with a partner or client of the gateway payment provider, such as a merchant or an acquirer. Partner computing devices 106 may be interconnected to the Internet through a variety of interfaces including a network, such as a LAN or a WAN, dial-in connections, cable modems, wireless modems, cellular communications, and special high-speed ISDN lines.

In the example embodiment, CR computing device 102 is configured to provide a customization portal to a partner at a partner computing device 106. CR computing device 102 receives customization rules from the partner computing device 106 via the customization portal, for customization of an embedded payment interface embedded on a webpage hosted by the partner. When the hosted webpage is accessed at a user computing device 104, CR computing device 102 receives an access message from the user computing device 104 that includes a plurality of data elements ("access characteristics") associated with the hosted webpage and/or the access of the hosted webpage by the user computing device 104. CR computing device 102 applies the customization rules to the access characteristics in real-time to generate the embedded payment interface on the user computing device 104. CR computing device 102 is further configured to receive payment information input to the embedded payment interface from the user computing device 104 and generate an authorization request message for processing by transaction processing network 101.

In one embodiment, CR computing device 102 includes a centralized database 110. In an alternative embodiment, database 110 is stored remotely from CR computing device 102 and may be non-centralized. Database 110 contains information on a variety of matters, for example, customization rules and associated parameters, access characteristics, transaction details, and more.

Figure 2:
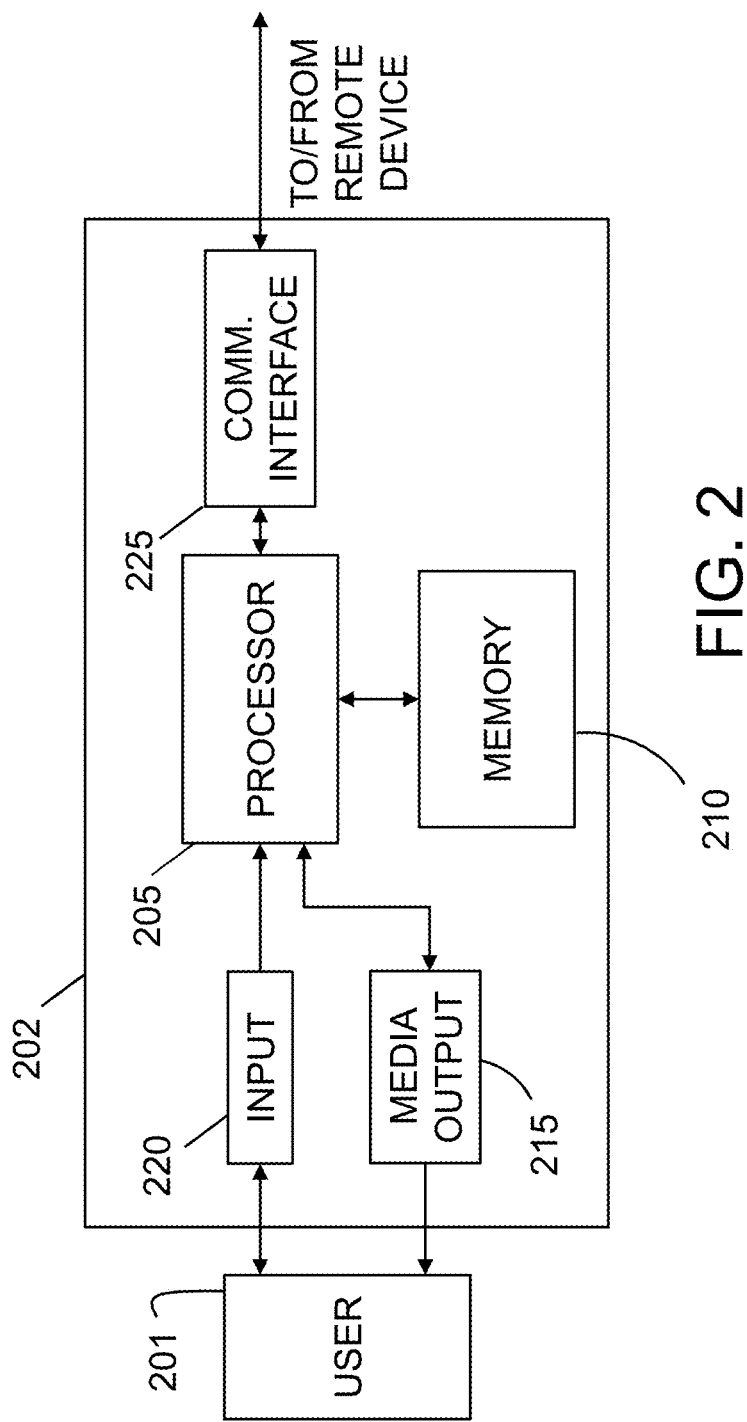

FIG. 2 illustrates an example configuration of a user system 202 operated by a user 201. User system 202 may include, but is not limited to, user computing devices 104 and/or partner computing devices 106. In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as a payment processor. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX), or an 802.11 wireless network (WLAN).

Stored in memory area 210 are, for example, computer readable instructions for providing a user interface to user 201 via media output component 215 and, optionally, receiving and processing input from input device 220. A user interface may include, among other possibilities, a web browser, client application, and a digital wallet. Web browsers enable users, such as user 201, to display and interact with media and other information typically embedded on a webpage or a website. A client application allows user 201 to interact with a server application from a server system.

Figure 3:
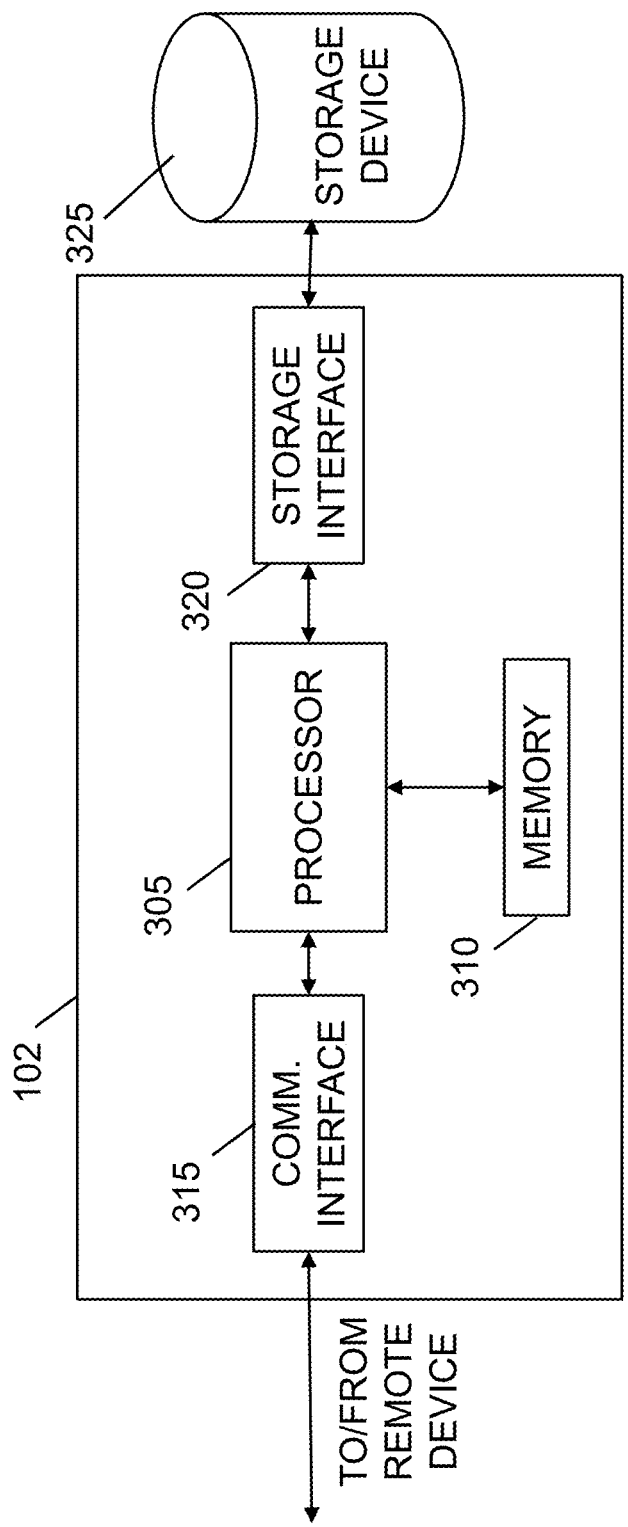

FIG. 3 illustrates an example configuration of custom rules (CR) computing device 102 (shown in FIG. 1). CR computing device 102 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on CR computing device 102, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that CR computing device 102 is capable of communicating with a remote device such as user computing devices 104. Processor 305 may also be operatively coupled to a storage device 325. Storage device 325 is any computer-operated hardware suitable for storing and/or retrieving data. In some embodiments, storage device 325 is integrated in CR computing device 102. For example, CR computing device 102 may include one or more hard disk drives as storage device 325. In other embodiments, storage device 325 is external to CR computing device 102. For example, storage device 325 may include multiple storage units such as hard disks or solid state disks in a redundant array of inexpensive disks (RAID) configuration. Storage device 325 may include a storage area network (SAN) and/or a network attached storage (NAS) system.

In some embodiments, processor 305 is operatively coupled to storage device 325 via a storage interface 320. Storage interface 320 is any component capable of providing processor 305 with access to storage device 325. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 325.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
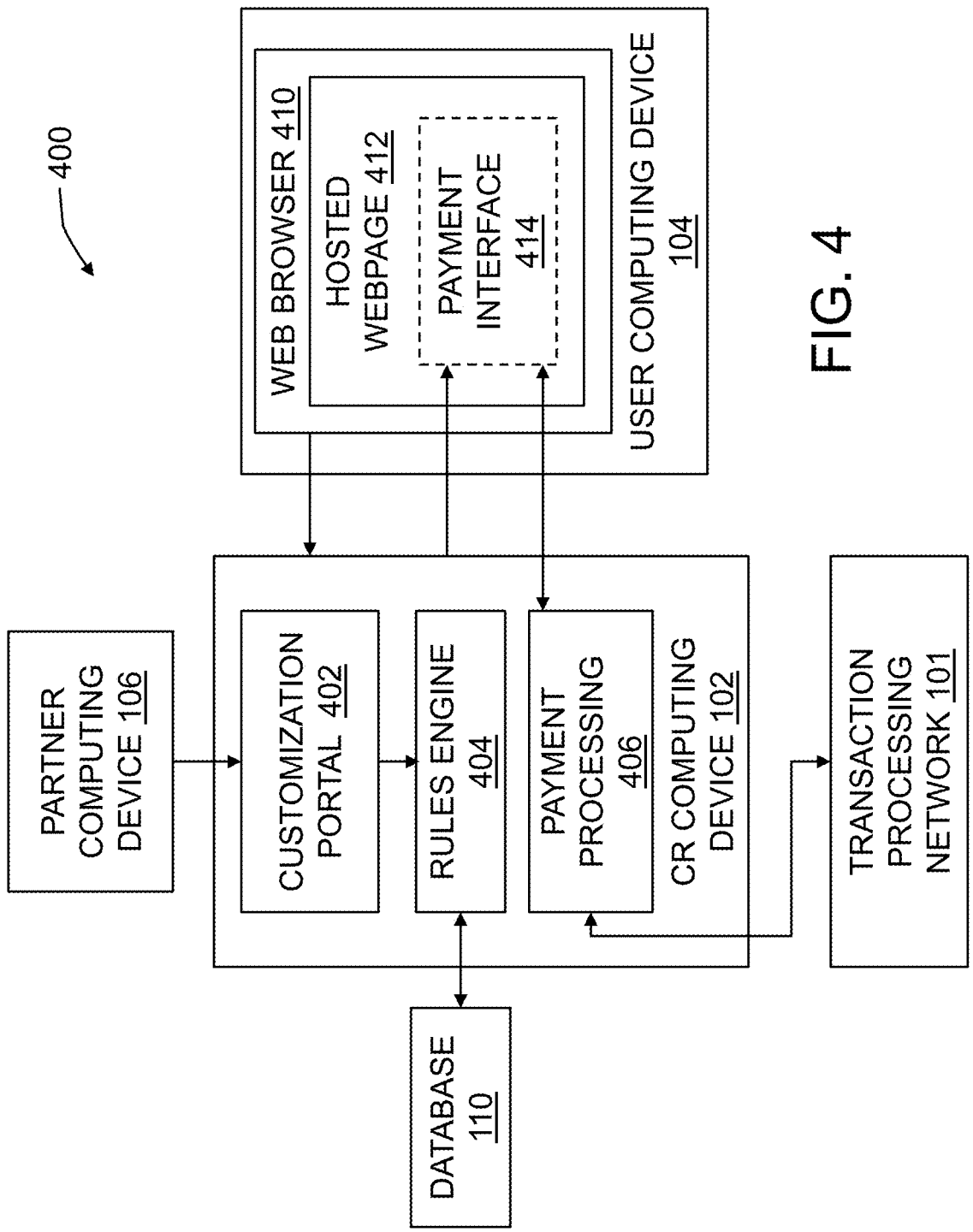

FIG. 4 is a schematic diagram 400 illustrating the flow of data between components of DIG system 100 shown in FIG. 1. In the example embodiment, partner computing device 106 is communicatively coupled to CR computing device 102, which is also communicatively coupled to user computing device 104 and transaction processing network 101. CR computing device 102 may be associated with transaction processing network 101 or with another gateway service provider.

In the illustrated embodiment, CR computing device 102 provides a customization portal 402 accessible by partner computing device 106. Customization portal 402 includes a user interface with a plurality of input fields to facilitate input of a plurality of customization rules and associated parameters by a user (e.g., an administrator) of partner computing device 106, as described in greater detail herein below. CR computing device 102 further includes a rules engine 404 configured to process the customization rules input at customization portal 402 to identify any errors or conflicts that may need to be corrected by the user of partner computing device 106. CR computing device 102 stores the customization rules in database 110.

User computing device 104 includes a user interface (not specifically shown) on which a web browser 410 is displayed. A user of user computing device 104, a customer, interacts with web browser 410 to navigate between webpages of a website hosted by the partner associated with partner computing device 106, such as a merchant. When a customer wishes to purchase goods or services, the customer navigates, using web browser 410, to a particular hosted webpage 412 associated with a checkout or purchase process. When hosted webpage 412 is accessed at or loaded onto web browser 410, an access message (not specifically shown) is transmitted from user computing device 104 to CR computing device 102.

The access message includes a plurality of data elements ("access characteristics") associated with hosted webpage 412 and/or with the access thereof by user computing device 104. Access characteristics may include, for example, but not limited to, device information associated with user computing device 104 (including location, device type, browser information, etc.), a time stamp of the access, the particular merchant hosting webpage 412, and user input previously provided to hosted webpage 412 (e.g., user log-in credentials, a user profile, cart data). The access message, in the example embodiment, includes a secure signature (e.g., a private key) such that CR computing device 102 can validate the access message or otherwise confirm that the access message, and the data therein, is properly associated with hosted webpage 412. The access message may be referred to as a "payload."

Rules engine 404 processes the access characteristics. Specifically, rules engine 404 applies the customization rules to the access characteristics to generate customization commands. Rules engine 404 accesses a default interface template from database 110 and applies the customization commands to the default interface template. Rules engines 404 formats access characteristics 606 for processing as input conditions for customization rules 506. For instance, a location access characteristic identifying a location of user computing device 104 is an input condition to a customization rule with an output condition parameter such as a display language and/or currency dependent on the location access characteristic. A customization command associated therewith would therefore change or update a default display language (e.g., English) to the display language associated with the location access characteristic (e.g., Arabic). CR computing device 102 subsequently causes display of a payment interface 414 embedded in hosted webpage 412 (e.g., an "embedded payment interface" 414) that complies with all of the customization commands.

Embedded payment interface 414 is therefore generated by CR computing device 102 without real-time input from partner computing device 106. Embedded payment interface 414 is considered to be associated with CR computing device 102 (and/or a gateway payment provider with which CR computing device 102 is associated). The user of user computing device 104 uses embedded payment interface 414 to complete the checkout process and initiate a payment transaction. For example, the user may enter payment credentials, a shipping address, a billing address, authentication information, and/or any other information into embedded payment interface 414. The information input to embedded payment interface 414 is transmitted to CR computing device 102 without intervention by partner computing device 106. In other words, partner computing device 106 does not receive information input to embedded payment interface 414, which may facilitate maintaining the security of the information input to embedded payment interface 414 (e.g., payment credentials).

CR computing device 102 includes a payment processing module 406 communicatively coupled to transaction processing network 101. CR computing device 102 generates a suitable transaction message for transmission to transaction processing network 101 for processing of the payment transaction initiated at user computing device 104. In some embodiments, CR computing device 102 is configured to generate an authorization request message (e.g., in an ISO 8583 message format) for processing over transaction processing network 101. For example, CR computing device 102 converts the web-based data elements submitted via embedded payment interface 414 to ISO 8583 formatted data elements. In other embodiments, CR computing device 102 forwards the web-based data elements submitted via embedded payment interface 414 to transaction process network 101 (e.g., to a specialized payment processor), where the web-based data elements are converted to ISO 8583 formatted data elements for further authorization processing.

CR computing device 102 receives an authorization result message from transaction processing network 101, the authorization result message indicating whether the purchase transaction was completed successfully. CR computing device 102 causes display of an authorization result indicator within embedded payment interface 414 or as a new webpage within web browser 410.

Figure 5:
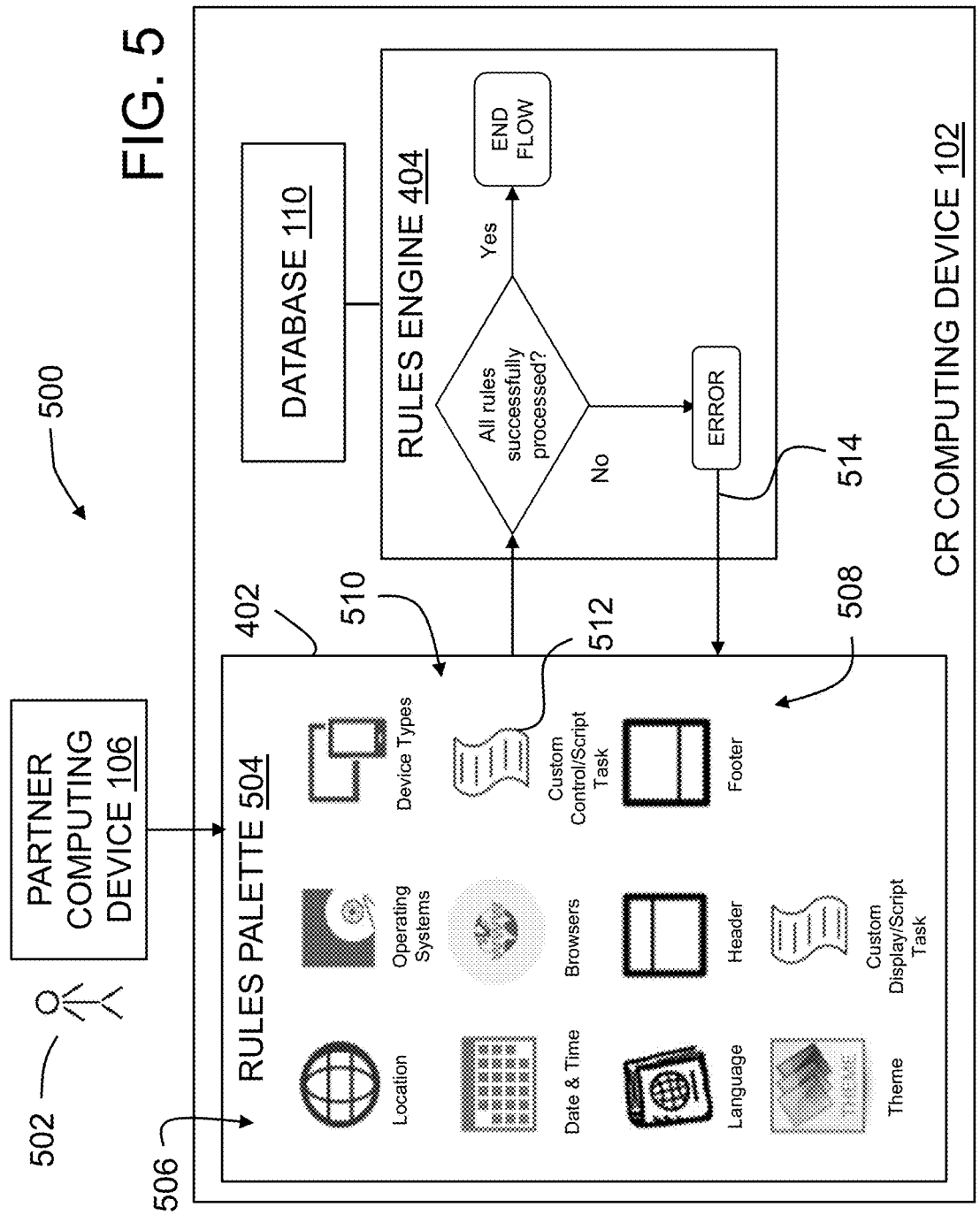
Figure 6:
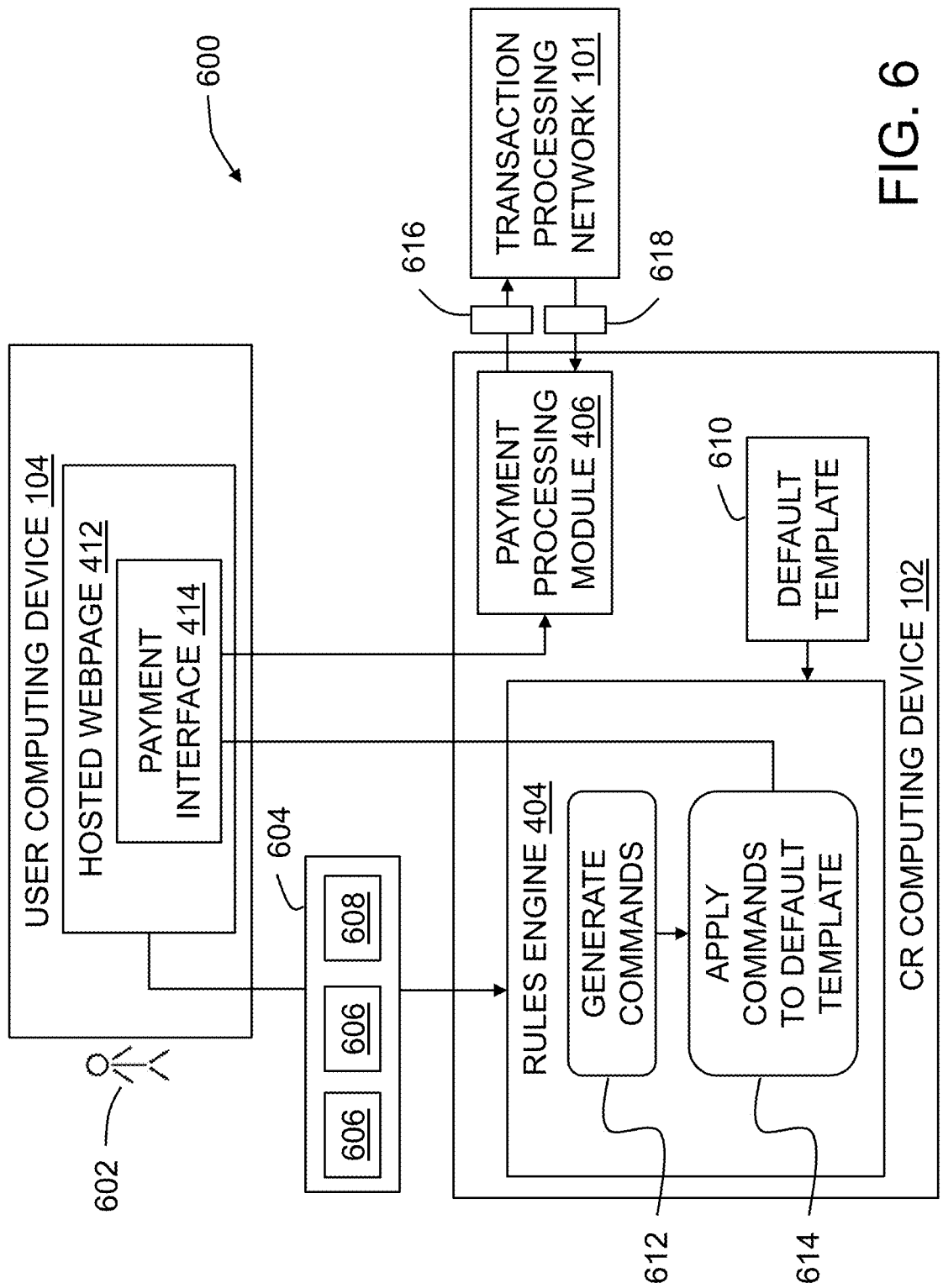

FIGS. 5 and 6 depict schematic diagrams illustrating the input and processing of customization rules to dynamically generate embedded payment interface 414 (shown in FIG. 4) in greater detail. FIG. 5 depicts a first flow diagram illustrating the initialization of customization rules using DIG system 100 (shown in FIG. 1), and FIG. 6 depicts a second flow diagram illustrating the dynamic generation of an embedded payment interface by CR computing device 102 (also shown in FIG. 1).

As shown in FIG. 5, CR computing device provides customization portal 402 to partner computing device 106. In the illustrated embodiment, a user 502 of partner computing device 106 may be a marketing administrator or other user, and may be referred to generally herein as a partner 502. Customization portal 402 includes a rule palette 504 that enables partner 502 to define their own rules 506 for embedded payment interface 414 (shown in FIG. 4), including visual or aesthetic rules 508 as well as access control features 510. Partner 502 interacts with rules palette 504 to input one or more customization rules 506, and parameters defining each rule 506. CR computing device 102, specifically rules engine 404, receives and stores customization rules 506 and, upon the hosted webpage 412 (shown in FIG. 4) being loaded, actively applies rules 506 to a default interface template to generate a customized, embedded payment interface 414 in real-time, as described further with respect to FIG. 6.

Rules palette 504 enables partner 502 to dynamically input and/or select a plurality of customization rules 506 to define a desired configuration of embedded payment interface 414. Rules 506 can be used to integrate embedded payment interface 414 directly into hosted webpage 412, such that embedded payment interface 414 is seamless within hosted webpage 412. Rules palette 504 may enable partner 502 to customize, for example, but not limited to, a size of embedded payment interface 414, an orientation of embedded payment interface 414, a location of embedded payment interface 414 on hosted webpage 412, a display language, a currency, a header, a footer, text, colors, other branding features, an overall theme, additional graphics, promotional features, security features, authentication features, and/or other features. Each rule 506 is associated with one or more parameters. Parameters may tie some features to other features (e.g., a language may be tied to a currency). Parameters may tie certain features to various characteristics of the access of hosted webpage 412 by user computing device 104, including, but not limited to, a location of user computing device 104, a device type of user computing device 104, a time of access of hosted webpage 412, a date of access of hosted webpage 412, a browser identifier of a web browser used to access hosted webpage 412 at user computing device 104, an operating system of user computing device 104, display characteristics of hosted webpage 412 at user computing device 104, and log-in credentials provided at user computing device 104. In other words, rules 506 define the configuration of embedded payment interface 414 as a function of at least one of a configuration of hosted webpage 412 and one or more integration characteristics associated with hosted webpage 412 and embedded payment interface 414. As used herein, "integration characteristics" refers generally to aesthetic rules 506 that visually integrate embedded payment interface 414 with hosted webpage 412.

For example, a parameter for a size rule may tie the display size of embedded payment interface 414 to a device type of user computing device 104 used to access hosted webpage 412 (e.g., a smaller interface at a cell phone, and a larger interface at a laptop computer). A parameter for a language rule may tie the display language to a location of user computing device 104 or a user profile (where a user may define a preferred display language). A parameter for a promotional content rule may tie the display of promotional content or the provision of promotional features (e.g., discounts or coupons) to a time or date of access, a location, and/or log-in credentials. Partner 502 may define a rule that prevents access to embedded payment interface 414 for certain types of user computing devices 104, for unsecured connections, for user computing devices 104 in certain locations, or in response to other features of user computing device 104 or an intended transaction. Accordingly, certain parameters define an "input" to a rule 506 and an "output" of a rule 506 that is dependent upon the input.

Rules palette 504 may include a drag-and-drop interface and/or include any other input and control features, including drop-down menus, sliders, buttons, text input fields, image or other content upload options that facilitate flexibility in rule input. Rules palette 504, or another display portion of customization portal 402, may further provide a visual data flow of rules 506, including a visualization of input and output parameters of one or more rules 506 to facilitate visualization of "if-then" rules (e.g., if user computing device 104 in Canada, then embedded payment interface 414 should display a logo that includes a maple leaf). Rules palette 504 may also include functionality that enables partner 502 to prioritize rules 506. For instance, one rule 506 may prevent access in China unless a tokenized user computing device 104 is used to access hosted webpage 412. Accordingly, partner 502 may prioritize a rule 506 defining particular aspects of embedded payment interface 414 based on accessing user computing device 104 over a rule 506 defining aspects of embedded payment interface 414 based on location. Additionally or alternatively, rules engine 404 may automatically apply priorities based on logic.

In some embodiments, rules palette 504 provides a plurality of rules from which partner 502 can select, and partner 502 defines the parameters of the selected rule 506. Additionally or alternatively, rules palette 504 enables partner 502 to generate a complete custom rule 512. For example, partner 502 may define a custom rule 512 using a scripting language (e.g., JAVASCRIPT), to provide finer control of the rule definition. One example custom rule 512 may be created as follows:

```
If (payer.firstName == "John" and payer.lastName == "doe") then
    showErrorPage( )
else
    continue to next phase
```

Partner 502 may also define rules 506 that control some aspects of transaction processing of purchase transactions initiated using embedded payment interface 414. For instance, partner 502 may define a customization rule 506 that requires additional authentication (e.g., for every customer, for user computing devices 104 in a certain location, for transaction initiated at a certain time or for a transaction amount above a threshold). Partner 502 may further define how authentication is to proceed to direct the customer to input additional authentication details. Partner 502 may define a customization rule 506 that defines how webpage 412 displays the results of a transaction (e.g., a "payment successful" webpage is to be displayed, or where to direct a customer is a payment is unsuccessful). In some embodiments, partner 502 hosting webpage 412 may define one or more rules 506 for how a transaction is to be processed, even though partner computing device 106 is not directly involved in the transaction processing. For example, partner 502 may input customization rules 506 defining which transaction processing networks 101 should be used, what types or brands of payment cards to accept, and other such rules. Certain rules 506 may also be automatically implemented based on a particular partner's relationships with acquirers or transaction processing networks 101.

Moreover, an acquirer partner 502 may define rules that affect payment interfaces 414 for a plurality of merchants with which the acquirer has relationships. For example, the acquirer may require all merchants to accept only MASTERCARD or VISA payment cards, and to not accept AMERICAN EXPRESS payment cards. An acquirer may define a rule 506 that prevents access to embedded payment interface 414 for any non-US merchant.

In the example embodiment, partner 502 accesses customization portal 402 in an initialization or onboarding process with the gateway payment provider. Partner 502 may further have access to customization portal 402 at any time to update or change customization rules 506.

Rules engine 404 is configured to process each customization rule 506 input by partner 502 and the parameters of each rule 506. Rules engine 404 processes each rule 506 and, if any rule 506 cannot be processed (e.g., includes contradictory or otherwise unprocessable input/output parameters), rules engine 404 displays an error message 514 to prompt partner 502 to correct any errors. Rules engine 404 may sort, prioritize, or otherwise process rules 506 such that rules 506 are properly implemented upon generation of embedded payment interface 414. In some embodiments, rules engine 404 may override merchant-input rules in cases where the acquirer has a rule 506 set that contradicts a rule 506 a merchant partner is trying to input, or may display an error message 516 or other alert to a merchant partner 502 as the merchant partner 502 is setting up their own rules 506. Rules engine 404 stores processed rules 506 and parameters in database 110 at a storage location associated with partner 502 and/or partner computing device 106. Accordingly, where CR computing device 102 is communicatively coupled to a plurality of partner computing device 106 and is configured to dynamically generate a respective embedded payment interface 414 for each of a plurality of corresponding partners, CR computing device 102 may retrieve the appropriate set of rules 506 to generate the embedded payment interface 414.

Turning to FIG. 6, a user 602 of user computing device 104 (e.g., a customer) navigates to hosted webpage 412 to complete a purchase of goods or services from a merchant (a "payment transaction" or "purchase transaction"). To complete the purchase transaction, user 602 must provide their payment credentials (e.g., a credit or debit card number, user log-in information corresponding to saved payment credentials, a bank account number, digital wallet information, etc.) into embedded payment interface 414 on hosted webpage 412.

When hosted webpage 412 is loaded on user computing device 104, an access message 604 is transmitted to CR computing device 102 from user computing device 104. Access message 604 is also referred to as a "payload" and provides a plurality of data elements 606 to CR computing device 102. These data elements 606 maybe referred to as "access characteristics" 606 and are associated with hosted webpage 412 and/or access of hosted webpage 412 by user computing device 104. Access characteristics 606 may include, for example, but not limited to, device information associated with user computing device 104 (including location, device type, browser information, etc.), a time stamp of the access, the particular merchant hosting webpage 412, and user input previously provided to hosted webpage 412 (e.g., user log-in credentials, a user profile, cart data). Access message 604, in the example embodiment, also includes a secure signature 608 (e.g., a private key) such that CR computing device 102 can validate access message 604 or otherwise confirm that access message 604, and the data elements 606 therein, is properly associated with hosted webpage 412. Secure signature 608 and/or one or more alternative data element(s) 606 of access message 604 may include an identification of partner computing device 106 (shown in FIG. 1) hosting webpage 412, an acquirer thereof, and/or other data elements that may affect the processing of transactions initiated on hosted webpage 412 via embedded payment interface 414.

CR computing device 102 validates access message 604 and parses access message 604 to identify one or more of access characteristics 606. CR computing device 102 uses access characteristics 606 to initiate generation of embedded payment interface 414. Rules engine 404 actively applies customization rules 506 (shown in FIG. 5) to a stored default interface template 610 to generate customized, embedded payment interface 414 in real-time. Specifically, rules engine 404 uses access characteristics 606 as inputs to one or more customization rules 506 to generate (in a process 612) customization commands based on the outputs of customization rules 506, wherein the customization commands define the output configuration of embedded payment interface 414. Rules engine 404 accesses default interface template 610 (e.g., from database 110, shown in FIG. 1) and applies (in a process 614) the customization commands to default interface template 610. In the example embodiment, applying 614 the customization rules to default interface template 610 produces a payment interface having an output configuration corresponding to the desired configuration of embedded payment interface 414. In other words, rules engine 404 generates an intermediate data structure defining the output configuration for embedded payment interface 414.

If partner 502 (shown in FIG. 5) has not input a rule 506 for particular display features and/or functionality of embedded payment interface 414, rules engine 404 will not generate a customization command for that particular aspect of embedded payment interface 414, such that a default rule is implemented associated with that particular aspect. In other words, that aspect of default interface template 610 is not changed.

Embedded payment interface 414 is then embedded into (or displayed on) hosted webpage 412 at user computing device 104. User 602 uses embedded payment interface 414 to complete the checkout process and initiate a payment transaction. For example, user 602 may enter payment credentials, a shipping address, a billing address, authentication information, and/or any other information into embedded payment interface 414. The information input to embedded payment interface 414 is transmitted to CR computing device without intervention by the partner computing device 106 hosting webpage 412. In other words, partner computing device 106 does not, in the example embodiment, directly receive information input to embedded payment interface 414 when the transaction is initiated, which may facilitate maintaining the security of the information input to embedded payment interface 414 (e.g., payment credentials).

CR computing device 102 includes payment processing module 406 that facilitates transmission of transaction data 616 to transaction processing network 101 (which may be the gateway payment provider) for subsequent authorization (and/or authentication) processing. For example, payment processing module 406 includes functionality to convert web-based user input (e.g., into embedded payment interface 414) into an encrypted and/or otherwise secured authorization request message (e.g., an ISO 8583 message) for transmission to transaction processing network 101.

Transaction processing network 101 returns the result of the transaction processing to CR computing device 102 in an authorization result message 618. If the transaction was authorized successfully transaction processing network 101 transmits authorization result message 618 including a success indicator data element to CR computing device 102, and CR computing device 102 causes embedded payment interface 414 and/or hosted webpage 412 to load a "payment successful" message or navigate to another webpage (e.g., at which user 602 is provided details of the authorized payment, such as a receipt and an order number). If the authorization was unsuccessful, transaction processing network 101 returns the authorization result message 618 including a failure indicator data element to CR computing device 102, and CR computing device 102 causes embedded payment interface 414 and/or hosted webpage 412 to request alternative payment details or additional information, or otherwise indicates to user 602 that the payment was not successfully processed.

Figure 7:
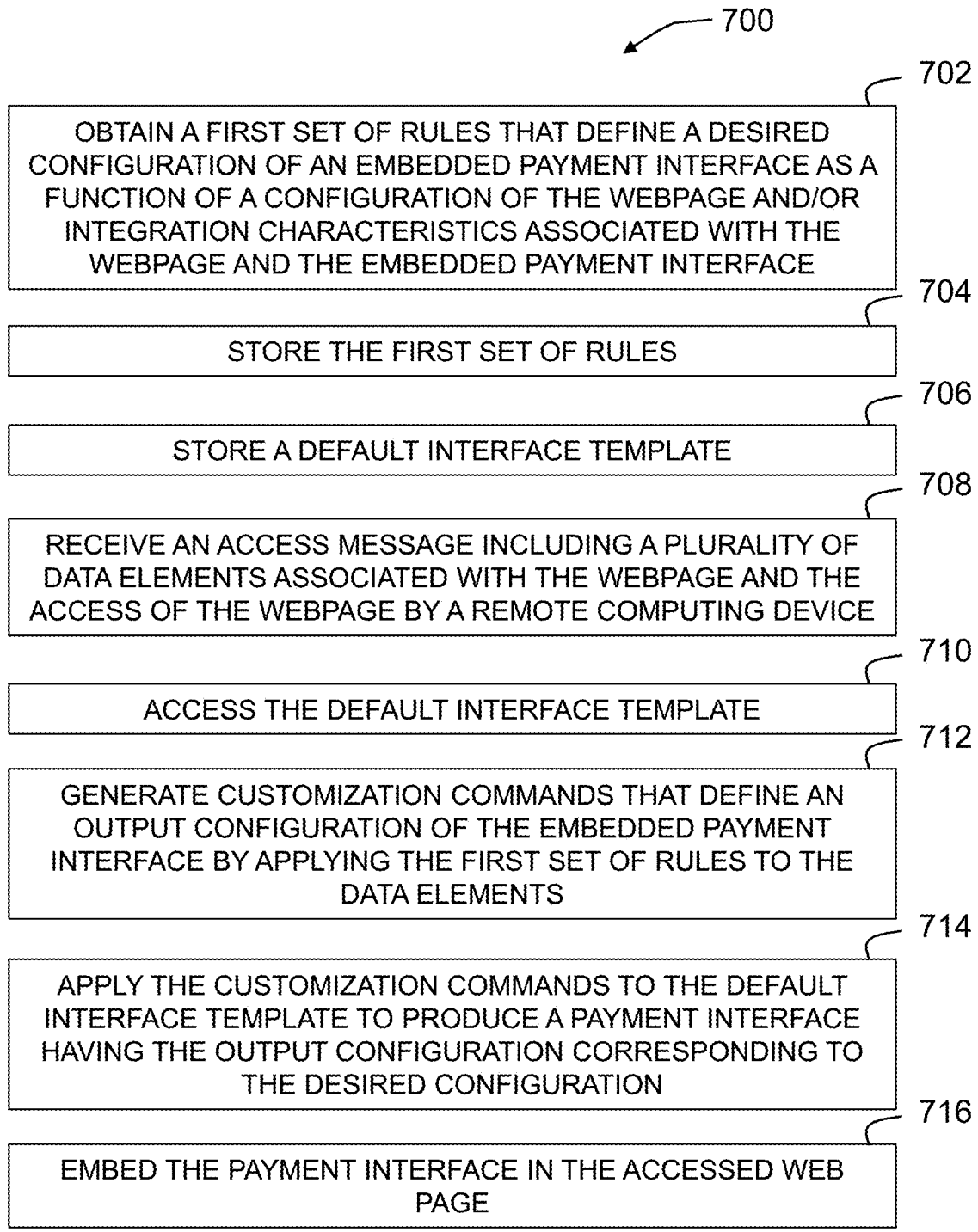

FIG. 7 is a flowchart of an example method 700 of dynamically generating an embedded payment interface (e.g., embedded payment interface 414, shown in FIG. 4) to enable integration of the embedded payment interface with a webpage into which the embedded payment interface is embedded (e.g., hosted webpage 412, also shown in FIG. 4) upon loading of the webpage. In the example embodiment, method 700 is implemented using custom rules (CR) computing device 102 (shown in FIG. 1).

Method 700 includes obtaining 702, from a host of the webpage (e.g., partner 502, shown in FIG. 5), a first set of rules (e.g., customization rules 506, also shown in FIG. 5) that define a desired configuration of the embedded payment interface as a function of at least one of a configuration of the webpage and one or more integration characteristics associated with the webpage and the embedded payment interface.

Method 700 also includes storing 704 the first set of rules, and storing 706 a default interface template (e.g., default interface template 610, shown in FIG. 6) having a default configuration. Method 700 includes receiving 708 an access message (e.g., access message 604, shown in FIG. 6) indicating that the webpage has been or is being accessed at a remote computing device (e.g., user computing device 104, shown in FIG. 1), the access message including a plurality of data elements (e.g., data elements or access characteristics 606, shown in FIG. 6) associated with the webpage and the access of the webpage by the remote computing device.

Method 700 further includes accessing 710 the default interface template, and generating 712 a set of customization commands that define an output configuration of the embedded payment interface by applying the first set of rules to the plurality of data elements. Method 700 further includes applying 714 the customization commands to the default interface template to produce a payment interface having the output configuration corresponding to the desired configuration, and embedding 716 the payment interface in the accessed webpage to produce the embedded payment interface.

As will be appreciated based on the foregoing specification, the above-described embodiments of the disclosure may be implemented using computer programming or engineering techniques including computer software, firmware, hardware or any combination or subset thereof, wherein the technical effect is providing positioning determination using wireless and payment transactions data. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for dynamically generating an embedded payment interface to enable integration of the embedded payment interface with a webpage into which the embedded payment interface is embedded upon loading of the webpage, said method implemented using a computer system that includes a processor and a memory, said method comprising:

obtaining, from a host of the webpage, a first set of rules that define a desired configuration of the embedded payment interface as a function of at least one of a configuration of the webpage and one or more integration characteristics associated with the webpage and the embedded payment interface;

storing, in the memory, the first set of rules input by the host;

storing, in the memory, a default interface template including a plurality of default rules that define a default configuration including a plurality of default features of the embedded payment interface where no first set of rules have been input by the host;

receiving an access message indicating that the webpage is accessed at a remote computing device, the access message including a plurality of data elements associated with the webpage and the access of the webpage by the remote computing device;

accessing the default interface template;

generating a set of customization commands that define an output configuration of the embedded payment interface by applying the first set of rules to the plurality of data elements;

applying the customization commands to the default interface template to change at least one default feature of the default configuration and produce a payment interface having the output configuration corresponding to the desired configuration; and embedding the payment interface in the accessed webpage to produce the embedded payment interface with the desired configuration.

2. The method of claim 1 further comprising:

generating a customization portal including a rule palette enabling input of the first set of rules, the rule palette including a plurality of input fields, each input field corresponding to a rule of the first set of rules; and receiving, in each input field, a set of parameters for the corresponding rule, the set of parameters defining input conditions and output conditions for each rule, wherein generating the customization commands by applying the first set of rules to the plurality of data elements comprises formatting the plurality of data elements for processing as input conditions for the first set of rules.

3. The method of claim 2, wherein generating the customization commands further comprises generating the customization commands based on the output conditions for each rule of the first set of rules based on the input conditions.

4. The method of claim 2, wherein receiving the access message including a plurality of data elements comprises receiving the access message including at least one of a location of the remote computing device, a device type of the remote computing device, a time of access of the webpage, a date of access of the webpage, a browser identifier of a web browser used to access the webpage at the remote computing device, an operating system of the remote computing device, display characteristics of the webpage at the remote computing device, and log-in credentials provided at the remote computing device.

5. The method of claim 1, wherein obtaining the first set of rules comprises obtaining the first set of rules including one or more of a size configuration rule, an orientation configuration rule, a language rule, a currency rule, a header rule, a footer rule, a graphics rule, a branding rule, a theme rule, and a page location rule.

6. The method of claim 1, further comprising:
obtaining, from a respective host of each of a plurality of second webpages, a respective first set of rules that define a desired configuration of the embedded payment interface as a function of at least one of a configuration of the respective second webpage and one or more integration characteristics associated with the respective second webpage and the embedded payment interface;
storing, in the memory, each respective first set of rules;
receiving an access message indicating that one of the plurality of second webpages is accessed; and
retrieving the respective first set of rules corresponding to the accessed second webpage to generate the embedded payment interface.

7. The method of claim 1, wherein the computer system is in networked communication with a payment processing network, said method further comprising:
receiving, via the embedded payment interface, transaction information associated with a payment transaction initiated using the embedded payment interface by a user of the remote computing device; and
transmitting the transaction information to the payment processing network for processing of the payment transaction.

8. A custom rules (CR) computer system for dynamically generating an embedded payment interface to enable integration of the embedded payment interface with a webpage into which the embedded payment interface is embedded upon loading of the webpage, said CR computer system comprising a processor and a memory, said CR computer system configured to:
obtain, from a host of the webpage, a first set of rules that define a desired configuration of the embedded payment interface as a function of at least one of a configuration of the webpage and one or more integration characteristics associated with the webpage and the embedded payment interface;
store, in said memory, the first set of rules input by the host;
store, in said memory, a default interface template including a plurality of default rules that define a default configuration including a plurality of default features of the embedded payment interface where no first set of rules have been input by the host;
receive an access message indicating that the webpage is accessed at a remote computing device, the access message including a plurality of data elements associated with the webpage and the access of the webpage by the remote computing device;
access the default interface template;
generate a set of customization commands that define an output configuration of the embedded payment interface by applying the first set of rules to the plurality of data elements;
apply the customization commands to the default interface template to change at least one default feature of the default configuration and produce a payment interface having the output configuration corresponding to the desired configuration; and
embed the payment interface in the accessed webpage to produce the embedded payment interface with the desired configuration.

9. The CR computer system of claim 8, further configured to:
generate a customization portal including a rule palette enabling input of the first set of rules, the rule palette including a plurality of input fields, each input field corresponding to a rule of the first set of rules; and
receive, in each input field, a set of parameters for the corresponding rule, the set of parameters defining input conditions and output conditions for each rule,
wherein to generate the customization commands, said CR computer system is further configured to format the plurality of data elements for processing as input conditions for the first set of rules.

10. The CR computer system of claim 9, wherein to generate the customization commands, said CR computer system is further configured to generate the customization commands based on the output conditions for each rule of the first set of rules based on the input conditions.

11. The CR computer system of claim 9, wherein the access message includes at least one of a location of the remote computing device, a device type of the remote computing device, a time of access of the webpage, a date of access of the webpage, a browser identifier of a web browser used to access the webpage at the remote computing device, an operating system of the remote computing device, display characteristics of the webpage at the remote computing device, and log-in credentials provided at the remote computing device.

12. The CR computer system of claim 8, wherein the first set of rules include one or more of a size configuration rule, an orientation configuration rule, a language rule, a currency rule, a header rule, a footer rule, a graphics rule, a branding rule, a theme rule, and a page location rule.

13. The CR computer system of claim 8, further configured to:
obtain, from a respective host of each of a plurality of second webpages, a respective first set of rules that define a desired configuration of the embedded payment interface as a function of at least one of a configuration of the respective second webpage and one or more integration characteristics associated with the respective second webpage and the embedded payment interface;
store, in the memory, each respective first set of rules;
receive an access message indicating that one of the plurality of second webpages is accessed; and
retrieve the respective first set of rules corresponding to the accessed second webpage to generate the embedded payment interface.

14. The CR computer system of claim 8, wherein said CR computer system is in networked communication with a payment processing network, said CR computer system further configured to:
- receive, via the embedded payment interface, transaction information associated with a payment transaction initiated using the embedded payment interface by a user of the remote computing device; and
- transmit the transaction information to the payment processing network for processing of the payment transaction.

15. A non-transitory computer-readable storage medium that includes computer-executable instructions for dynamically generating an embedded payment interface to enable integration of the embedded payment interface with a webpage into which the embedded payment interface is embedded upon loading of the webpage, wherein when executed by a computer system comprising a processor in communication with a memory device, the computer-executable instructions cause the computer system to:
- obtain, from a host of the webpage, a first set of rules that define a desired configuration of the embedded payment interface as a function of at least one of a configuration of the webpage and one or more integration characteristics associated with the webpage and the embedded payment interface;
- store, in said memory, the first set of rules input by the host;
- store, in said memory, a default interface template including a plurality of default rules that define a default configuration including a plurality of default features of the embedded payment interface where no first set of rules have been input by the host;
- receive an access message indicating that the webpage is accessed at a remote computing device, the access message including a plurality of data elements associated with the webpage and the access of the webpage by the remote computing device;
- access the default interface template;
- generate a set of customization commands that define an output configuration of the embedded payment interface by applying the first set of rules to the plurality of data elements;
- apply the customization commands to the default interface template to change at least one default feature of the default configuration and produce a payment interface having the output configuration corresponding to the desired configuration; and
- embed the payment interface in the accessed webpage to produce the embedded payment interface with the desired configuration.

16. The non-transitory computer-readable storage medium in accordance with claim 15, wherein the computer-executable instructions further cause the computer system to:
- generate a customization portal including a rule palette enabling input of the first set of rules, the rule palette including a plurality of input fields, each input field corresponding to a rule of the first set of rules; and
- receive, in each input field, a set of parameters for the corresponding rule, the set of parameters defining input conditions and output conditions for each rule,
- wherein to generate the customization commands, the computer-executable instructions further cause the computer system to format the plurality of data elements for processing as input conditions for the first set of rules.

17. The non-transitory computer-readable storage medium in accordance with claim 16, wherein to generate the customization commands, the computer-executable instructions further cause the computer system to generate the customization commands based on the output conditions for each rule of the first set of rules based on the input conditions.

18. The non-transitory computer-readable storage medium in accordance with claim 16, wherein the access message includes at least one of a location of the remote computing device, a device type of the remote computing device, a time of access of the webpage, a date of access of the webpage, a browser identifier of a web browser used to access the webpage at the remote computing device, an operating system of the remote computing device, display characteristics of the webpage at the remote computing device, and log-in credentials provided at the remote computing device.

19. The non-transitory computer-readable storage medium in accordance with claim 15, wherein the first set of rules include one or more of a size configuration rule, an orientation configuration rule, a language rule, a currency rule, a header rule, a footer rule, a graphics rule, a branding rule, a theme rule, and a page location rule.

20. The non-transitory computer-readable storage medium in accordance with claim 15, wherein the computer-executable instructions further cause the computer system to:
- obtain, from a respective host of each of a plurality of second webpages, a respective first set of rules that define a desired configuration of the embedded payment interface as a function of at least one of a configuration of the respective second webpage and one or more integration characteristics associated with the respective second webpage and the embedded payment interface;
- store, in the memory, each respective first set of rules;
- receive an access message indicating that one of the plurality of second webpages is accessed; and
- retrieve the respective first set of rules corresponding to the accessed second webpage to generate the embedded payment interface.

* * * * *